(12) United States Patent
Timmons

(10) Patent No.: US 10,663,243 B2
(45) Date of Patent: May 26, 2020

(54) FIREARM PIVOT PIN SYSTEM

(71) Applicant: David Rian Timmons, Ketchum, ID (US)

(72) Inventor: David Rian Timmons, Ketchum, ID (US)

( * ) Notice: Subject to any disclaimer, the term of this patent is extended or adjusted under 35 U.S.C. 154(b) by 811 days.

(21) Appl. No.: 15/203,686

(22) Filed: Jul. 6, 2016

(65) Prior Publication Data

US 2017/0016690 A1   Jan. 19, 2017

Related U.S. Application Data

(60) Provisional application No. 62/191,981, filed on Jul. 13, 2015.

(51) Int. Cl.
| | | |
|---|---|---|
| *F41A 3/66* | (2006.01) | |
| *F41A 11/02* | (2006.01) | |
| *F16B 21/16* | (2006.01) | |

(52) U.S. Cl.
CPC .............. *F41A 11/02* (2013.01); *F16B 21/16* (2013.01); *F41A 3/66* (2013.01)

(58) Field of Classification Search
CPC .. F41A 11/00; F41A 3/66; F41A 11/02; F16B 21/10; F16B 21/16; Y10T 403/59; Y10T 403/591; Y10T 403/598; Y10T 403/599; Y10T 403/32893
USPC .... 403/321, 322.1, 324, 325, 154; 42/75.01, 42/75.02, 75.3, 75.03
See application file for complete search history.

(56) References Cited

U.S. PATENT DOCUMENTS

| | | | | |
|---|---|---|---|---|
| 2,858,725 | A | * 11/1958 | Thompson | ............... B60D 1/02 411/356 |
| 3,199,240 | A | * 8/1965 | Largen | .................... F41A 17/22 42/70.03 |
| 3,236,155 | A | * 2/1966 | Sturtevant | ................. F41A 3/18 89/199 |
| 4,102,124 | A | * 7/1978 | Swager | ................... F16G 15/06 403/154 |
| 4,406,194 | A | * 9/1983 | Gersch | .................... B23B 29/04 407/45 |
| 4,521,985 | A | 6/1985 | Smith et al. | |
| 5,155,284 | A | * 10/1992 | Flashkes | ............... F41A 21/484 42/75.02 |

(Continued)

OTHER PUBLICATIONS

Screenshots of YouTube video, DIY AR-15 Build—Pivot Pin Installation, Jun. 8, 2011, 2 pages.

(Continued)

*Primary Examiner* — Josh Skroupa
(74) *Attorney, Agent, or Firm* — Pedersen & Company, PLLC; Ken J. Pedersen; Barbara S. Pedersen

(57) ABSTRACT

A pivot pin is for engagement and/or disengagement from its position as a pivot axle and/or connector, for example, in a lower receiver of a firearm. The mostly cylindrical main body of the pivot pin includes a longitudinal detent track featuring at least one recessed dimple and an aperture extending radially through the track for transfer of a detent spring and detent pin through the main body into the detent chamber of the lower receiver. A capping device may then encapsulate/control the position of the detent pin relative to the detent chamber, and relative to the aperture and track of the pivot pin, and/or help reduce the migration of water and or debris into the detent track and/or the firearm.

9 Claims, 10 Drawing Sheets

(56) References Cited

U.S. PATENT DOCUMENTS

| | | | |
|---|---|---|---|
| 7,147,420 B2* | 12/2006 | Baus | F16B 19/109 |
| | | | 411/347 |
| 7,937,876 B1 | 5/2011 | Graham | |
| 8,474,169 B2* | 7/2013 | Cottle | F41C 23/04 |
| | | | 42/73 |
| 9,066,719 B2* | 6/2015 | Soutorine | A61B 17/072 |
| 9,151,555 B1* | 10/2015 | Huang | F16B 15/02 |
| 9,243,857 B2* | 1/2016 | Mills | F41A 11/04 |
| 9,389,031 B2 | 7/2016 | Gardner | |
| D762,804 S | 8/2016 | Gardner | |
| 2013/0055610 A1 | 3/2013 | Watkins | |
| 2015/0308768 A1* | 10/2015 | Mills | F41A 11/04 |
| | | | 42/75.03 |
| 2017/0051546 A1* | 2/2017 | Seekins | F41A 11/00 |

OTHER PUBLICATIONS

Sequence of screenshots of YouTube video, AR-15 Pivot Pin Install—The Easy Way!, May 7, 2012, 3 pages.

Screenshot of YouTube video, Quick & Simple AR-15 Lower Receiver Front Pivot Takedown Pin Install and Remove, Dec. 30, 2014.

* cited by examiner

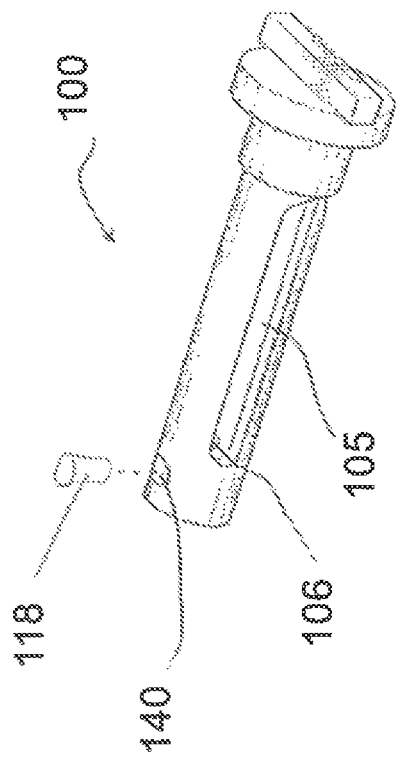
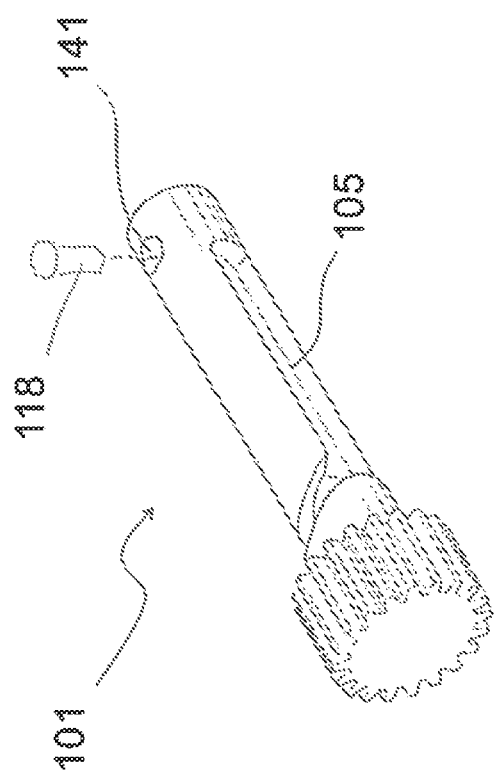

FIREARM PIVOT PIN SYSTEM

This application claims benefit of Provisional Application Ser. No. 62/191,981, filed Jul. 13, 2015, and entitled "Firearm Pivot Pin", the entire disclosure of which is incorporated herein by this reference.

BACKGROUND

Field of the Invention

The invention relates to a pivot pin system, for example, for securely and pivotally connecting the lower receiver to the upper receiver of a firearm. A lower and upper receiver configuration comprising a hinge with pivot pin is a popular firearm platform. This platform is utilized in a wide variety of firearms and is commonly known to be used for, but not limited to, AR15-style firearms.

Background and Related Art

Assuming that a firearm, that is designed to use a lower and upper receiver configuration, is in sound working condition, it is common knowledge for those skilled in the art that the forward connection points of the lower receiver (the "hinge portions" hereafter) and of the upper receiver (the "knuckle" hereafter) will cooperate with each other and be properly engaged with a pivot pin to form a hinge. When the pivot pin is properly installed, the lower and upper receivers may pivot open and or closed at these forward connection points. This is a very important aspect in that, when the receivers are in the pivoted-open position, the internal bodies of the lower and upper receivers are accessible to the operator so that ammunition jams can be cleared, the firearm can be cleaned, and or the firearm's parts can be accessed, repaired, or replaced. Thus, the pivot pin is an integral part of the overall configuration, safety, maintenance, and operation of a firearm using this type of lower and upper receiver configuration.

The pivot pin is conventionally a component of a "pivot pin assembly" that comprises the pivot pin, a detent spring, and a detent pin. These components may be assembled/installed in both the lower receiver and upper receiver, to create the beneficial pivot connection as discussed above. Alternatively, the pivot pin assembly may be assembled/installed in the lower receiver, without connection of the upper receiver, for example, prior to a later step of connecting the upper receiver and/or for storage of the lower receiver and pivot pin assembly as a unit. This is possible because the pivot pin assembly, by virtue of the detent system, may be slid axially into, and temporarily held in, either a "disengaged position" extending only into one of the hinge portions of the lower receiver, or an "engaged position" extending into both hinge portions of the lower receiver, whether or not the upper receiver is connected by its knuckle being inserted between the hinge portions of the lower receiver and captured by the pivot pin. Therefore, at certain times, the operator will install the pivot pin assembly in the lower receiver in either the disengaged position or the engaged position, without the upper receiver being connected. For subsequent connection of the upper receiver, the operator simply maintains the pivot pin in, or pulls the pivot pin back to, the disengaged position, inserts the knuckle between the lower receiver hinge portions, and then pushes the pivot pin to the engaged position to complete the pivot connection of the lower and upper receivers. Therefore, one may describe the pivot pin assembly as being "assembled to" or "installed in" the lower receiver in certain cases, and as being "assembled to" or "installed in" the lower receiver and the upper receiver in other cases.

Considering the importance of the pivot pin, it is vital that the pivot pin can be quickly and efficiently installed into, and removed from, the lower receiver and the upper receiver. Herein lies the concern with conventional, previously-existing pivot pin designs. For those who are familiar with firearms using a pivot pin, it is commonly known that the conventional process of assembling and disassembling the combination, of the pivot pin, detent spring, detent pin, and the lower receiver and/or upper receiver, is inefficient and may require specialty tools. Further, the conventional process may create ample opportunities for the detent spring and detent pin to be forcibly ejected from the detent chamber of the lower receiver, due to the uncontrolled release of compression force created by the compressed detent spring. Consequently, if the operator is unable to capture these parts as the spring compression force is released during conventional assembly or disassembly, the ejection of these parts can result in potential loss of, and/or damage to, the detent spring and or detent pin. Furthermore, these problems regarding installation and loss and damage are more inherent if the process is performed under stressful and/or adverse conditions, which is likely the case when performed by military, law enforcement or other operators needing to perform these tasks in the field. Thus, there is a need to improve and simplify the process of assembling and disassembling the pivot pin system for a firearm.

SUMMARY

The invented pivot pin system is configured to minimize the steps in assembly/disassembly of a pivot pin assembly with a lower receiver of a firearm, or with lower and upper receivers of the firearm, the difficulty of said steps, and/or the likelihood of loss or damage of components during said assembly/disassembly. The preferred pivot pin assembly is configured for use in a pivotal connection between a lower receiver and an upper receiver of a firearm such as an AR-15 style firearm. The preferred pivot pin assembly is configured for both easier installation and easier removal of the detent spring and detent pin relative to the detent chamber, and for easier, proper orientation of the pivot pin relative to the detent pin during the pivot pin installation.

A preferred pivot pin has a mostly cylindrical main body comprising a proximal positioning pin head end and an opposing distal end, a detent track that may contain one or more detent dimples, and at least one aperture with a synergistic position relative to the detent track. The aperture may be combined with a capping device to provide a synergistic combination of method steps regarding use of the pivot pin system.

The distal end of the pivot pin should be configured so it can be inserted into the forward connection points of the lower and upper receivers, namely, the lower receiver forward hinge portions and the upper receiver forward knuckle. The positioning pin head end should be configured to help an installer manipulate the pivot pin to align and position the detent track of the pivot pin in relation to the detent chamber of the lower receiver. The detent track, which is a recessed channel or other longitudinal groove in the main body, may run most of the length of the pivot pin from the positioning pin head end to the distal end.

The aperture extends through the pivot pin, into the detent track, so that the aperture comprises one open end in the detent track, and an opposite open end on the sidewall of the main body of the pivot pin diametrically opposed to the detent track. The aperture is configured to allow the assembly detent spring and detent pin to pass through the main body of the pivot pin, and so, in most embodiments, the aperture is a straight or substantially straight bore through the main body transverse to the longitudinal axis of the pivot pin.

The aspect of the aperture wherein it is positioned so that it extends through the detent track is very important. The location of the aperture in the track allows the operator to easily estimate the position of the aperture relative to the detent chamber and hence to align the aperture with the bore opening of the detent chamber of the lower receiver. This is due to several features being easily seen in the first step of pivot pin installation, namely, the track being easily visible generally all along the rear side of the pivot pin, the front opening of the aperture being easily visible opposite the track at the front side of the pivot pin, and the positioning pin head being formed with a flat side or other indication on the rear side that corresponds to the location of the track. This way, the operator can insert the pin axially into the proximal hinge portion of the lower receiver (FIG. 8), easily aligning the pin so that the aperture is aligned with the detent chamber. Once the pin is thus-aligned, a detent spring and detent pin can be easily transferred into the detent chamber of the lower receiver, by inserting the detent spring and detent pin in a first direction through the aperture and into the detent chamber, without the use of tools. Further, the detent pin, having been inserted through the aperture in the track, is already positioned to point to and/or extend into the track, and the pivot pin need not be rotated to move the track to the detent pin so that the detent pin can subsequently ride along the track. On the other hand, tools and/or rotation are typically needed for the conventional and pre-existing pivot pin assembly and/or disassembly processes.

Once a detent spring and detent pin have been inserted through the aperture into the detent chamber, a capping device may be used to effectively cap the aperture, which will urge/retain the detent pin in the position relative to the pivot pin and its detent track that is desired for the remainder of the pivot pin installation, and hence, the remainder of the process of connecting the upper and lower receivers. Specifically, the preferred capping device is configured and positioned to be inserted to effectively engage the detent pin in proper position in the detent track, for example, by use of a common tool for example, an Allen wrench, but without the need of specialty tools or rotation of the pivot pin. Once the capping device has been engaged in the desired position in the aperture, the tip of the detent pin rests against the capping device, which is preferably slightly recessed relative to the bottom wall of the track, as if forming a dimple in the track. When ready, the user may simply push the pivot pin axially into a fully installed "engaged" position in the lower receiver hinge portions and the knuckle of the upper receiver, without rotation of the pivot pin, other manipulation, or use of any tools.

Certain embodiments of the invention may comprise a capping device in combination with a pivot pin of alternative designs, for example, a pivot pin having a detent spring/pin insertion bore in any position on the pivot pin. Thus, it should be understood that a capping device according to certain embodiments may be engaged with any aperture in any pivot pin. The inventor envisions various applications for the capping device, for example, 1) capping or otherwise blocking any aperture in a pivot pin for improved installation or removal of a pivot pin, for example, for connection or disconnection of a lower receiver and upper receiver of a firearm and/or improved management of an associated detent pin and spring, and/or 2) prevention or reduction of migration of water and or debris into a detent track, other portions of a pivot pin or the firearm.

Further description, advantages and important aspects of the preferred pivot pins, preferred capping devices, and preferred methods of use, will be further explained using the provided drawings and detailed description below.

BRIEF DESCRIPTION OF THE DRAWINGS

FIG. 10 is a side view of an alternative pivot pin using an embodiment of the invented capping device.

FIG. 11 is a side view of yet another alternative pivot pin using an embodiment of the invented capping device.

DETAILED DESCRIPTION AND BEST MODE OF IMPLEMENTATION

The aspects of the disclosed device and enhanced assembly and/or disassembly process relate to a pivot pin used for firearms. The preferred pivot pin is the assembly pin which may engage and or disengage the lower receiver forward connection points, herein called the "hinge portions" to the upper receiver forward connection point, herein called the "knuckle", to form a pivotal hinge. This type of pivot pin and receiver assembly process may be used on a large number of firearm configurations, but the exemplary firearm provided herein is an AR15-style firearm. Considering the popularity of this type of firearm platform, not all of the conventional aspects of the pivot pin and or its assembly processes will be detailed herein in an effort to focus on the novel aspects of the pivot pin and pivot pin assembly. Furthermore, those familiar with firearms will recognize that alternative embodiments and or processes may be created and or performed wherein the basic principles of design and operation of the pivot pin are the same or similar.

Figure 1:
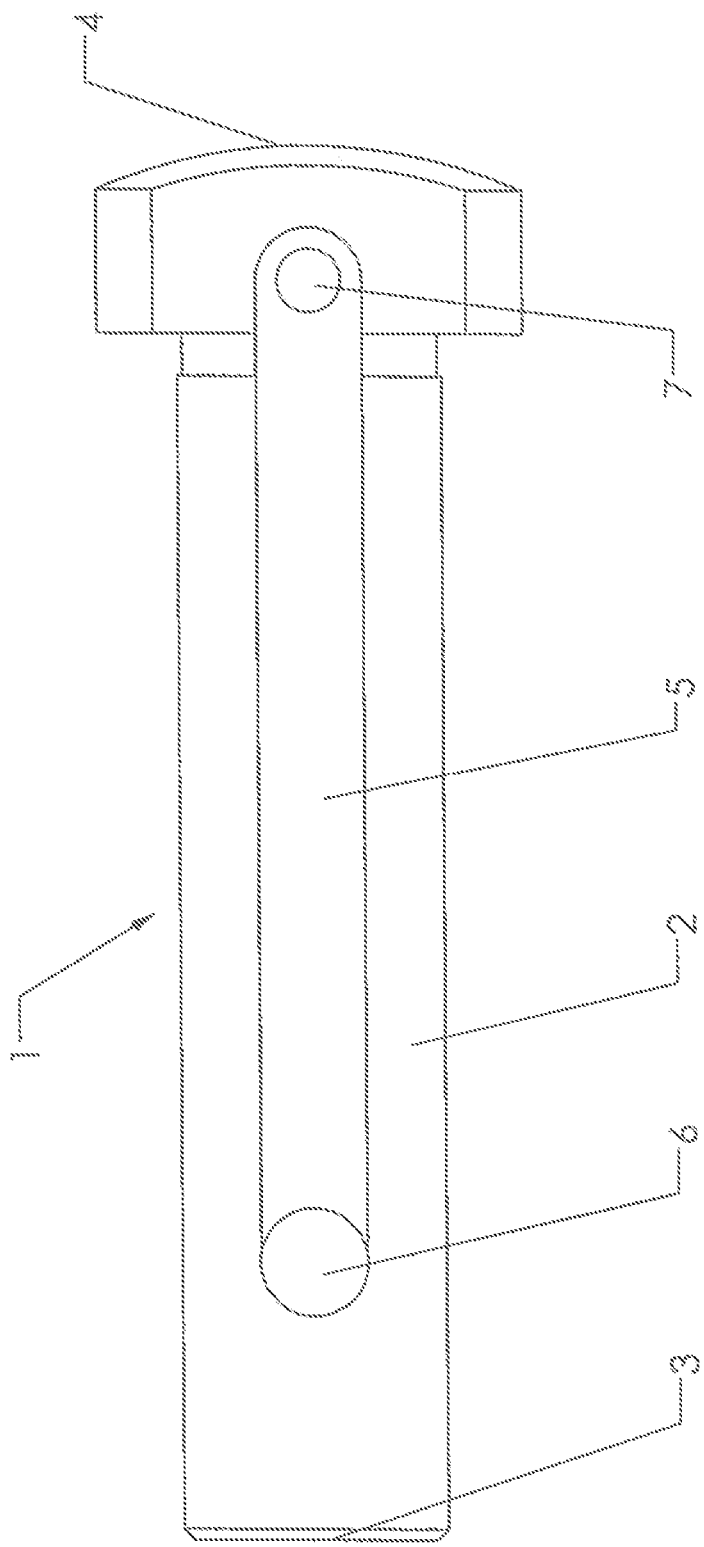
FIG. 1 is a rear side view of one embodiment of a pivot pin according to the invention.
Figure 2:
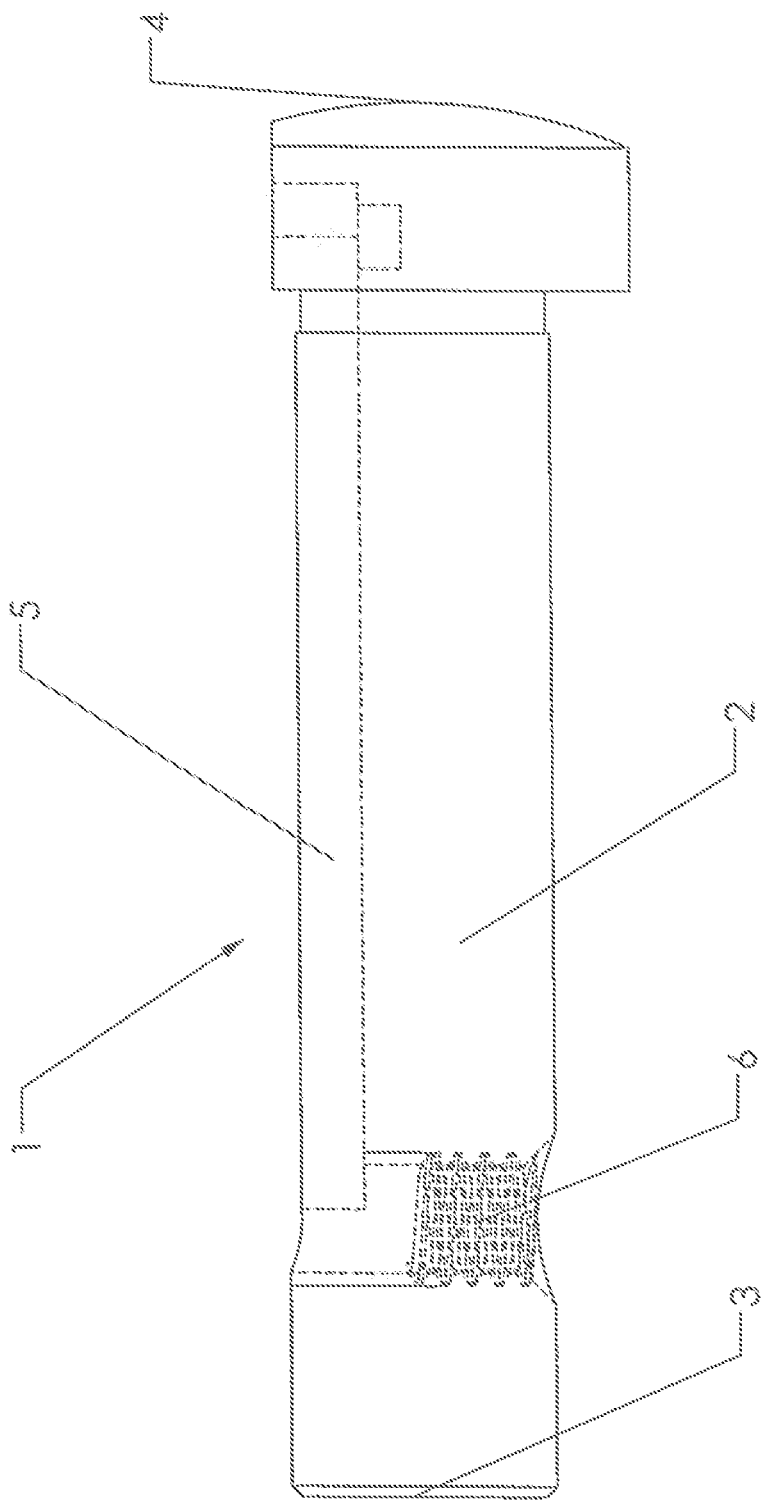
FIG. 2 is a bottom view of the pivot pin of FIG. 1, with dashed lines showing certain features of the pivot pin.
Figure 3:
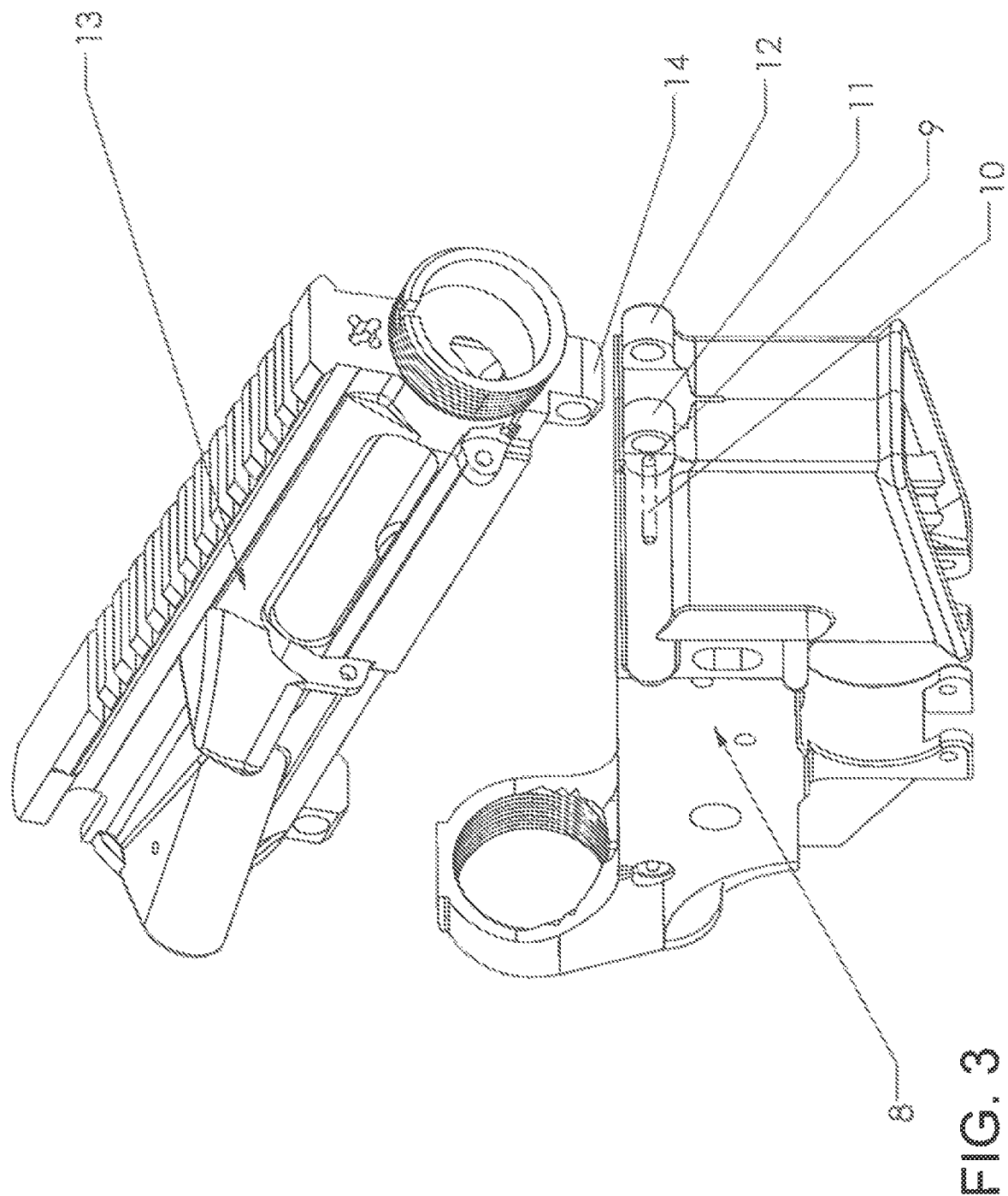
FIG. 3 is a front perspective view of an exemplary prior art AR15 lower receiver and exemplary prior art AR15 upper receiver, prior to being connected at their front connection points, including important aspects pertaining to their relationship with the pivot pin.
Figure 4:
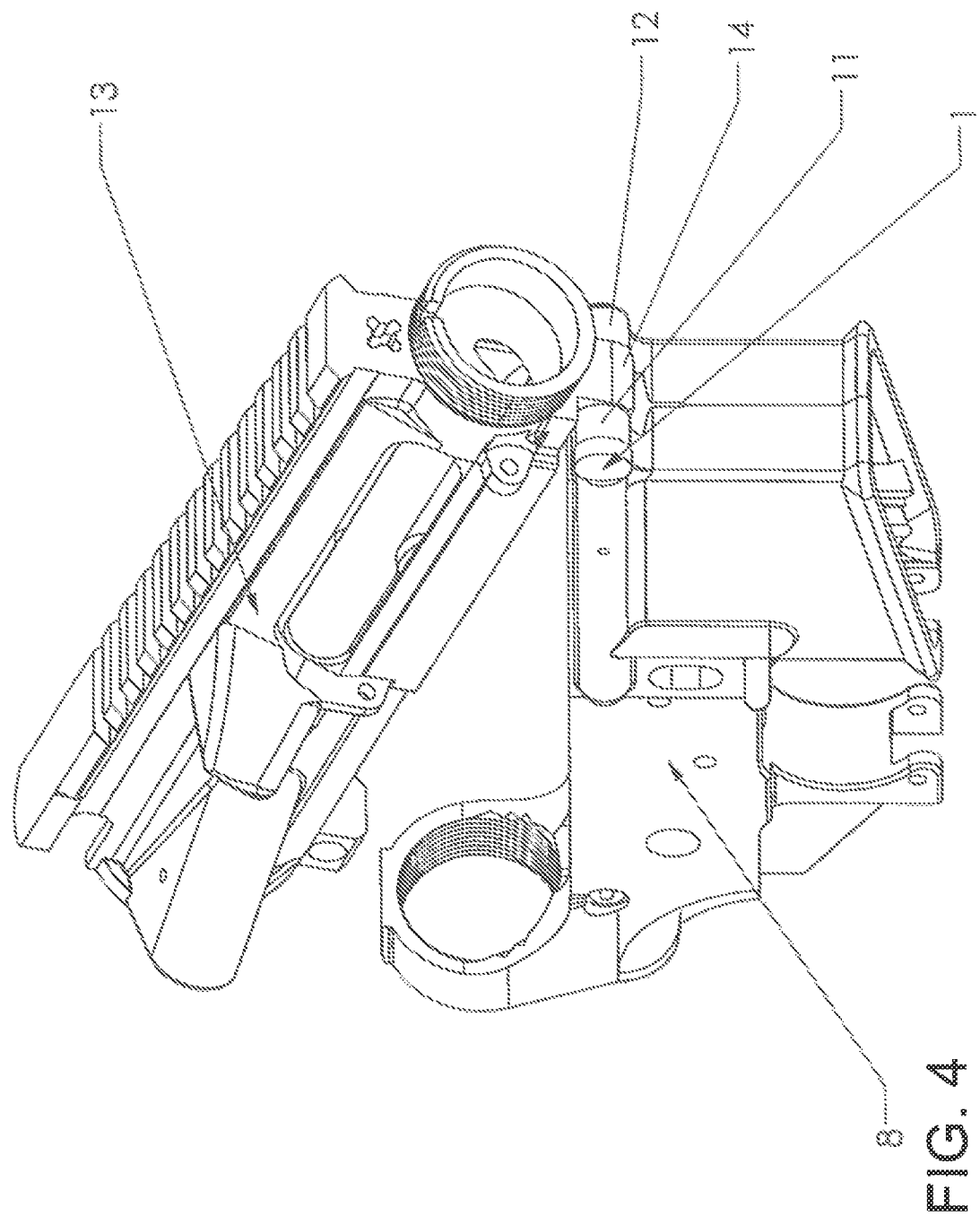
FIG. 4 is a front perspective view of the exemplary prior art AR15 lower receiver and exemplary prior art AR15 upper receiver, of FIG. 3, wherein the lower receiver and upper receiver connection points are properly engaged with the full-installed, engaged pivot pin, and the upper receiver is pivoted upward from the lower receiver.

FIGS. 1 and 2 portray the pivot pin 1 according to a preferred embodiment of the invention. In an effort to first give an understanding of the function of the pivot pin 1, FIGS. 3 & 4 illustrate an exemplary AR15 firearm lower receiver 8 and upper receiver 13 and their attributes pertaining to their relationship with the pivot pin 1. FIG. 3 depicts the lower receiver 8 without a pivot pin 1 assembly so one may view the lower receiver's 8 detent chamber bore opening 9, detent chamber 10, first hinge portion (or proximal hinge portion) 11, and second hinge portion (or distal hinge portion) 12, along with the knuckle 14 of the upper receiver 13.

FIG. 4 depicts the fully assembled and engaged pivot pin 1 and its relationship with the lower receiver 8 and upper receiver 13, wherein the pivot pin 1 is engaged through the first hinge portion 11, then through the knuckle 14, and then into the second hinge portion 12 of their respective receivers. Once the lower receiver 8 and the upper receiver 13 are engaged with the pivot pin 1, the connected hinge portions and knuckle connection points/pieces form a single hinge structure for the upper and lower receivers, which allows the receivers to pivot to an open or closed position. See FIG. 4 for an example of the lower receiver 8 and upper receiver 13 in a pivoted-open position. When the receivers are in a pivoted-open position, the operator can access the internal bodies of the lower receiver 8 and upper receiver 13 so that ammunition jams can be cleared, the firearm can be cleaned, and or the firearm's receiver assembly parts can be accessed, repaired, or replaced.

Referring back to FIGS. 1 and 2, FIG. 1 presents a rear side view, and FIG. 2 presents a bottom view, of the pivot pin 1. Pivot pin 1 has a mostly cylindrical main body 2 with a distal end 3 opposite to a positioning pin head end 4, a detent track 5, a dimple 7, and a uniquely configured aperture 6. The aperture 6 is a bore extending entirely through the pivot pin main body 2 and detent track 5, and having a minimum diameter at least slightly larger than the largest diameter of the detent spring and the detent pin. The aperture 6 is specifically designed to allow the detent spring 15 and detent pin 16 to be passed through the main body 2, by extending into and continuing through the detent track 5 of the pivot pin 1. The aperture 6 is preferably also specifically designed to receive a novel capping device.

It is important to consider the above-mentioned characteristics of the aperture 6, because someone skilled in the art of firearms will appreciate the advantageous configuration and simplicity of use enhanced by the use of the aperture 6 found in the pivot pin 1 compared to the apertures found in other conventional and or existing pivot pins. The location of the aperture 6 may be positioned anywhere along the mostly cylindrical main body 2 so that it extends into and through the detent track 5. It should also be understood the aperture 6 may be configured to receive any type of capping device, including closures, caps, plugs, inserts, or other devices configured to be retained in the aperture 6 while the pivot pin 1 is assembled to the lower receiver 8, but also removable from the aperture 6 for disassembly of the pivot pin 1 from said receiver 8.

FIG. 2 presents a bottom view of the pivot pin 1, wherein dashed lines portray the threaded aperture 6 intersecting the detent track 5 closest to the distal end 3 of the pivot pin 1. Aperture 6 extends from the front side to the rear side of the main body 2, through the detent track 5, and perpendicular to the length of the detent track 5 that runs axially along the main body 2. One may see to best advantage in FIG. 2 that about half of the generally cylindrical surface of aperture 6 is threaded, the threading being nearer the front surface of the main body 2 (facing bottom of sheet in FIG. 2) than the rear surface of the main body 2 that includes the detent track 5.

FIGS. 1 and 2 portray the pivot pin 1 according to a preferred embodiment wherein the aperture intersects the detent track close/near to the distal end of the pivot pin 1. This is preferred because 1) the pivot pin aperture may be properly-aligned with the detent chamber bore opening, early in the assembly process, when the pivot pin distal end is inserted only part way into the hinge portion 11 (FIG. 6), and 2) because the capping device cooperates with the aperture to mimic a distal dimple for temporarily retaining the pivot pin in the disengaged position. Alternatively, the aperture may be provided at alternative, more-proximal location(s) along the detent track, in which case, the operator could still align the aperture with the detent chamber bore opening in a similar manner as the preferred embodiment assembly process. If the more-proximal location were close/ at the proximal end of the pivot pin, that aperture and cooperating capping device could also serve at the proximal dimple for temporarily retaining the pivot pin in the engaged position. If the more-proximal location were midway between the distal and proximal ends, the capping device end surface would preferably be flush with the detent track bottom wall surface, so that a biased detent pin would not catch at this "midway" aperture location when the pivot pin is slid axially between the disengaged and engaged positions. In other words, a recessed capping device end surface, midway along the detent track, could create an unnecessary dimple-like structure that could interfere with smooth sliding between the disengaged and engaged positions.

Figure 5:
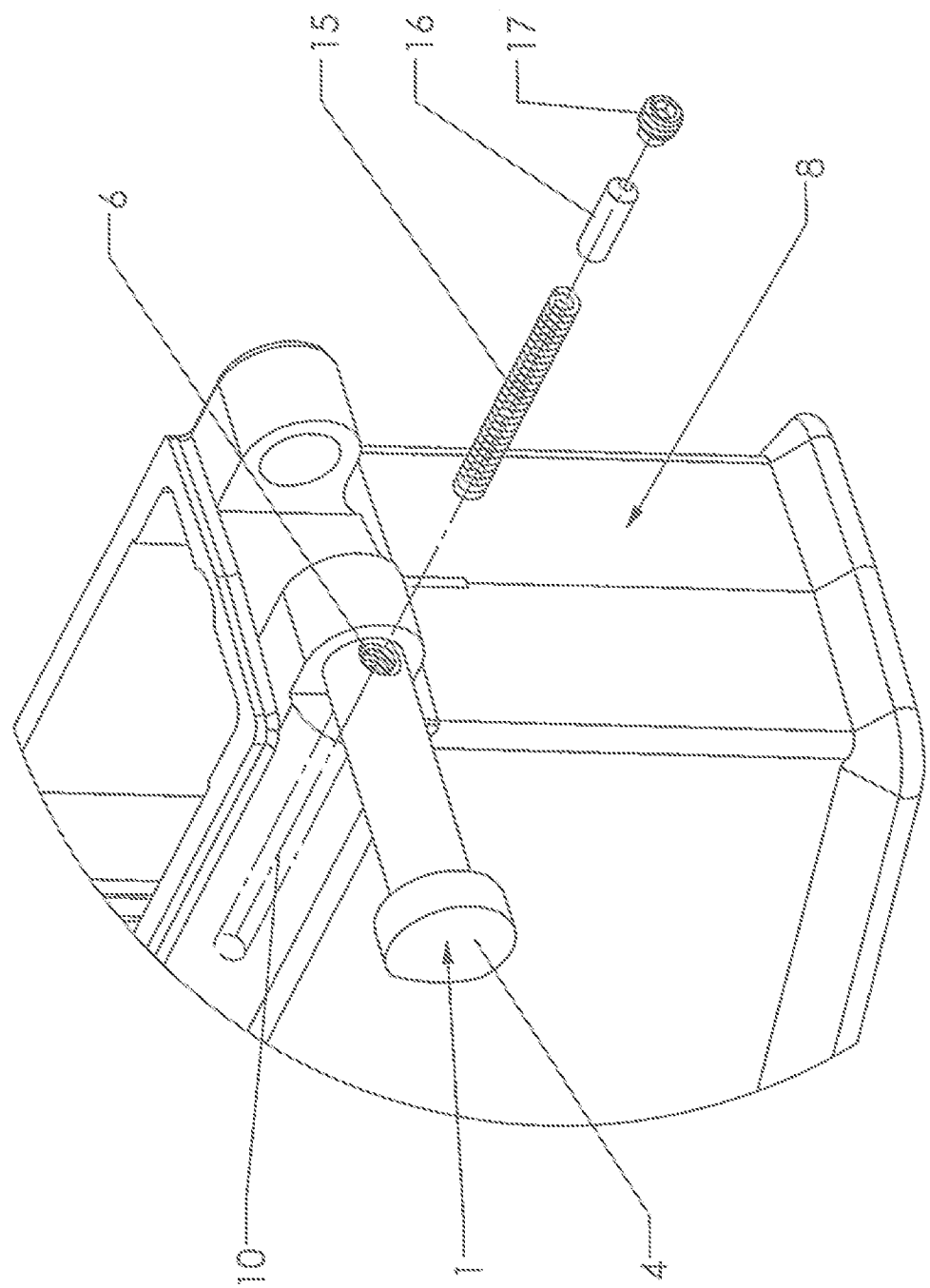
FIG. 5 is an exploded front perspective view illustrating early steps of the assembly of the pivot pin assembly into an exemplary prior art AR15 lower receiver, wherein an exemplary prior art detent pin and an exemplary prior art detent spring, and a capping device are being inserted into the aperture (in a first direction toward the upper left of the sheet).

FIG. 5 illustrates the assembly process of the pivot pin assembly, comprising pivot pin 1 and a capping device combined with the detent spring 15 and detent pin 16. The capping device embodiment shown in FIG. 5 is a threaded set screw 17 such as may be commercially available. Again referring to FIG. 5, the pivot pin 1 may be installed in the lower receiver 8 by inserting the distal end 3 of the pivot pin 1 into hinge portion 11, aligning the aperture 6 with the detent chamber bore opening 9, typically by the user grasping the pin head end 4. Aligning aperture 6 with bore opening 9 allows the user to insert detent spring 15 and detent pin 16 through the aperture 6 and into the detent chamber 10 of the lower receiver 8. Then, the set screw 17 may be engaged inside the aperture 6 to "cap" or block the aperture 6, for keeping the detent spring 15 and detent pin 16 in their respective desired operable positions.

Figure 6:
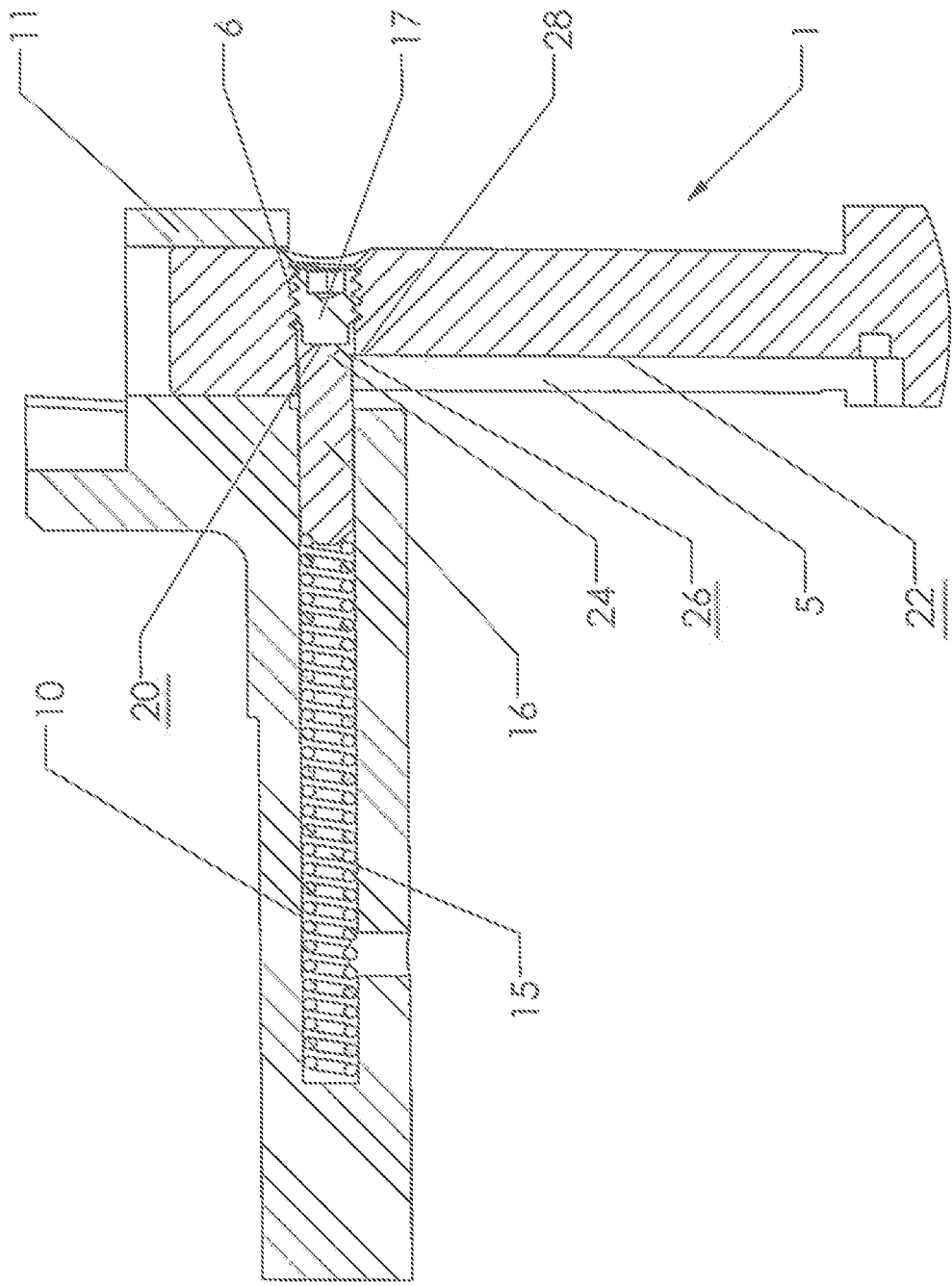
FIG. 6 is across-sectional top view illustrating the position, of the pivot pin of FIG. 1 and capping device and exemplary detent spring, detent pin, and lower receiver of FIG. 5, resulting from said early assembly steps illustrated in FIG. 5.

FIG. 6 further helps illustrate the simplicity and effectiveness of the pivot pin 1 system and assembly methods by depicting a cross-sectional view of the pivot pin and detent assemblies after the first assembly steps, namely, insertion of the distal end 3 into hinge portion 11 and insertion of the detent spring 15 and pin 16 followed by aperture-capping as described above. One may note that the detent pin 16 in FIG. 1 is partially inside the detent chamber and partially inside the aperture; it will be understood by those of skill in the art that the detent spring 15 in FIG. 6 is partly compressed and that said compression serves to bias the detent pin against the capping device. This compression will typically occur when the capping device is installed, as, up until then, the detent spring may be relaxed and the detent pin will be positioned so that it extends farther into the aperture. These steps result in the pivot pin 1 being in the "disengaged" position, wherein the pivot pin 1 is only inserted into one of the lower receiver's hinge portions, and the upper receiver knuckle 14 is not yet between hinge portions 11, 12 (as in FIG. 5) or is at least not yet connected to the lower receiver because the pivot pin 1 is not yet extending through the knuckle 14. In this disengaged position, the aperture 6 is coaxially aligned with the detent chamber bore 10 of the lower receiver 8, and, hence, the aperture 6 is also coaxially aligned with the installed detent spring 15, detent pin 16, and set-screw-style capping device 17.

Once said detent spring 15, detent pin 16, pivot pin 1 and capping device 17 are in said disengaged position, the user may continue to push the pivot pin 1 to its fully-installed or "engaged" position. This fully-installed, engaged position, represented by FIG. 4 comprises the pivot pin 1 extending through hinge portion 11, through the knuckle 14 of the upper receiver in its operable position between hinge portions 11 and 12, and into hinge portion 12. This completion of the pivot pin 1 assembly process may take place without any tools and without any force except axial pushing of the pivot pin 1 by the user. For those skilled in the art of firearms they may appreciate the pivot pins 1 advantageous assembly process compared to conventional and or existing pivot pins, considering no tools and/or rotation of the pivot pin 1 are needed to complete the assembly of the pivot pin 1 to the lower receiver 8 once a capping device has been engaged with the aperture 6. The structure and reasons for the advantageous assembly steps, that take the pivot pin assembly and firearm from the configuration/position of FIGS. 5 and 6 to the fully-installed, engaged configuration/position of FIG. 4, are further discussed later in this document.

Those skilled with firearms may also appreciate the advantageous disassembly process of the pivot pin 1 compared to the disassembly process of conventional and/or existing pins. To further explain, the pivot pin system may be disassembled, for example after use of the firearm and once the pivot pin has been returned to the disengaged position in relation to the lower receiver 8. This disassembly will be done by removing the capping device, which simultaneously releases the compression force of the detent spring 15, for example, with a conventional tool such as a simple Allen wrench, followed by removal of the detent spring 15 and detent pin 16 from the detent chamber 10 in a controlled manner, through aperture 6 in a second direction that is opposite said first direction mentioned earlier in this document. Thus, the disassembling of the pivot pin assembly and the detent assembly may take place as the reverse of the assembly process, without tools except perhaps an Allen Wrench or other extractor for the capping device. Again, because the aperture is in/at the track, rotation of the pivot pin 1 is not required during the disassembly. This disassembly procedure thus reduces the potential for the detent pin 16 and/or the detent spring 15 to be ejected uncontrollably or unexpectedly from the detent chamber 10 and consequently being lost and or damaged, which is a prevalent concern when disassembling conventional and/or existing pivot pins from the lower receiver 8.

Figure 7:
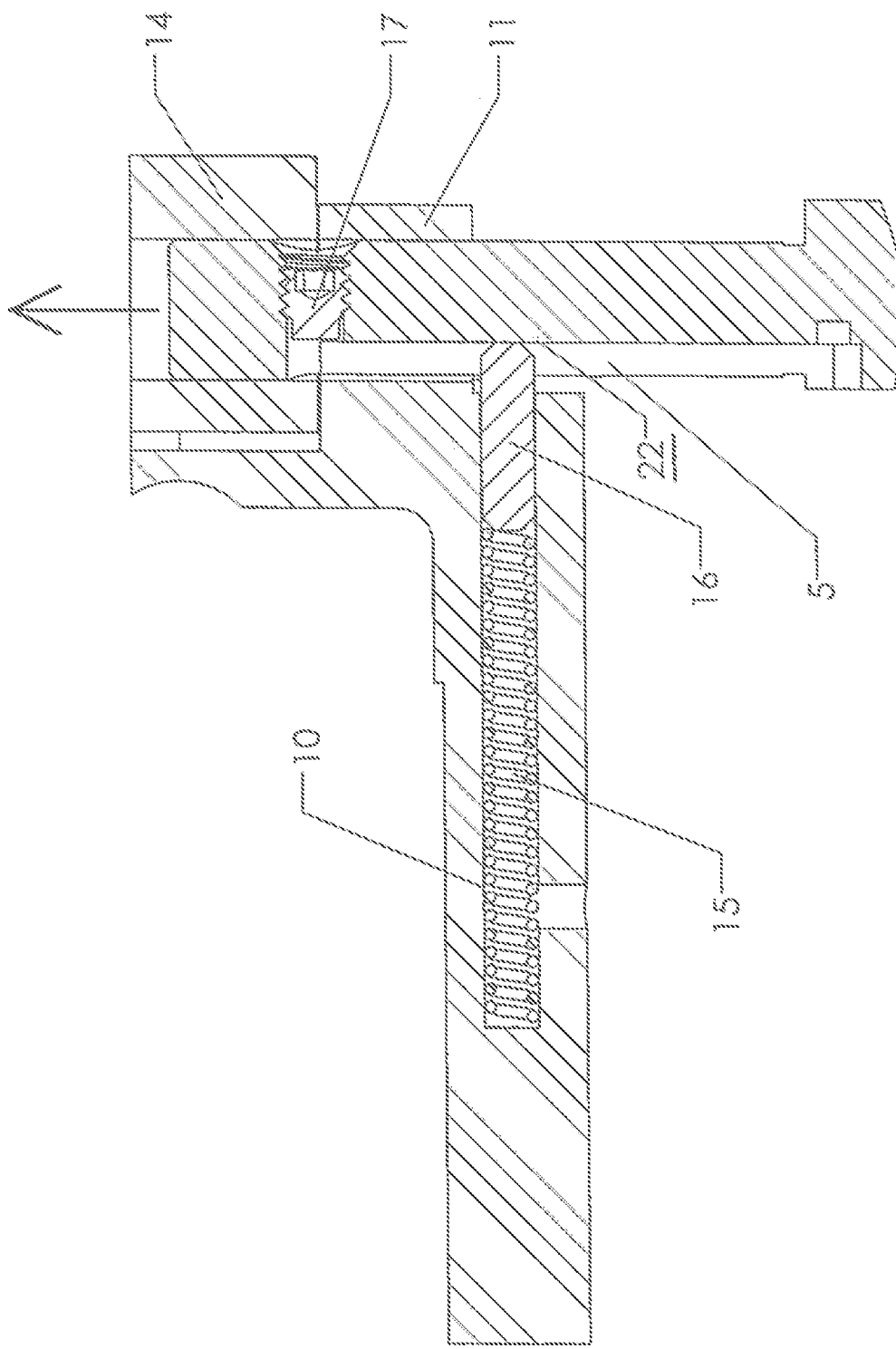
FIG. 7 is a across-sectional top view illustrating the position, of the pivot pin of FIG. 1 and capping device and exemplary detent spring, detent pin, and lower receiver of FIG. 5, resulting from the operator continuing to push the pivot pin axially, so that the detent pin moves from the aperture to the bottom wall of the track toward the fully-installed, engaged position.

An additional benefit of the aperture 6 being used in conjunction with a capping device is that the capping device may be sunk into the aperture 6 to a specific depth to optimize its functionality in relationship to the detent pin 16. This means a capping device, in certain embodiments, could be sunk at any depth into the aperture 6 depending on the desired function. In the preferred embodiment of FIG. 6, the end surface 20 of the set screw 17 used as a capping device is slightly below the bottom wall surface 22 of the detent track 5, that is, the end surface 20 is not flush with the bottom wall surface 22 but instead is closer to the central longitudinal axis of the pivot pin than is the bottom wall surface 22. This creates a slight deviation/recess in the aperture 6 for the tip 24 of the detent pin 16 to engage/extend into when the pivot pin 1 is in the disengaged position (FIG. 6). This configuration and position may also allow the detent pin 16 to be dislodged from this deviation/recess when force is applied in the axial direction to push the pivot pin 1 farther into the hinge portions/knuckle (FIG. 7). This is made possible in preferred embodiments by the tip 24 of the detent pin 16 having a chamfered/beveled side surface 26 (see also FIG. 5). Upon the operator pushing the pivot pin 1 axially further into the hinge, the side surface 26 will ride/slide up and over the corner 28 between the aperture 6 and the bottom wall surface 22, to continue to slide axially along the track bottom wall surface 22, biased by the spring 15 against the track bottom wall surface 22, in the position illustrated in FIG. 7, for example. Thus, the deviation created by the slightly recessed capping device in relationship to the detent track 5 mimics the function of a dimple (such as dimple 7) recessed into the detent track 5, in that, like a dimple, the recess caused by the capping device may receive the detent pin tip and hence retain the position of the pivot pin relative to the detent pin and the lower receiver until the operator chooses to push or pull the pivot pin axially from that position.

Thus, the capped aperture may simulate a dimple in the detent track designed to catch/receive the tip of the detent pin to hold the pivot pin in a desired position until force is purposely applied by the operator/installer. Conventionally, dimples are recesses in a pivot pin track surface, in the bottom wall of the track near each end of the detent track. This way, a conventional pivot pin can be held, by the detent pin being biased by the spring into each dimple when the pivot pin in a disengaged position (nearly uninstalled, at the beginning of installation or at the end of removal) or an engaged position (fully-installed). On the other hand, preferred embodiments of the pivot pin according to this disclosure comprise one dimple in the track, and one aperture through the entire main body at the track, with the one aperture serving multiple functions including as a detent pin and spring installation and removal bore and, also, when fitted with a capping device, as a dimple for holding the pivot pin in a desired location relative to the hinge portions and knuckle during certain steps/portions of the assembly and disassembly methods.

Figure 8:
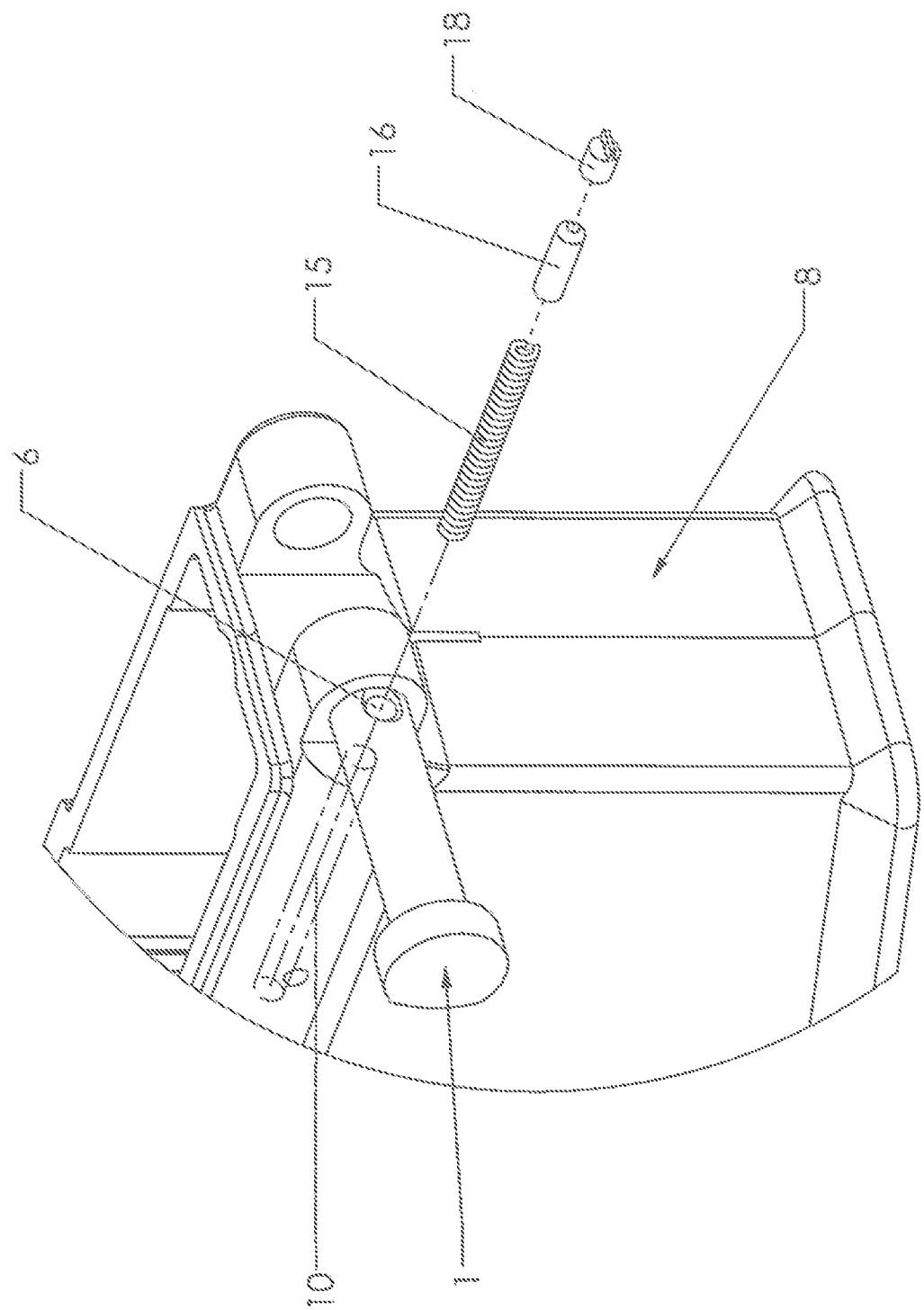
FIG. 8 is an exploded front perspective view of the assembly of FIG. 6 but using an alternative capping device.
Figure 9:
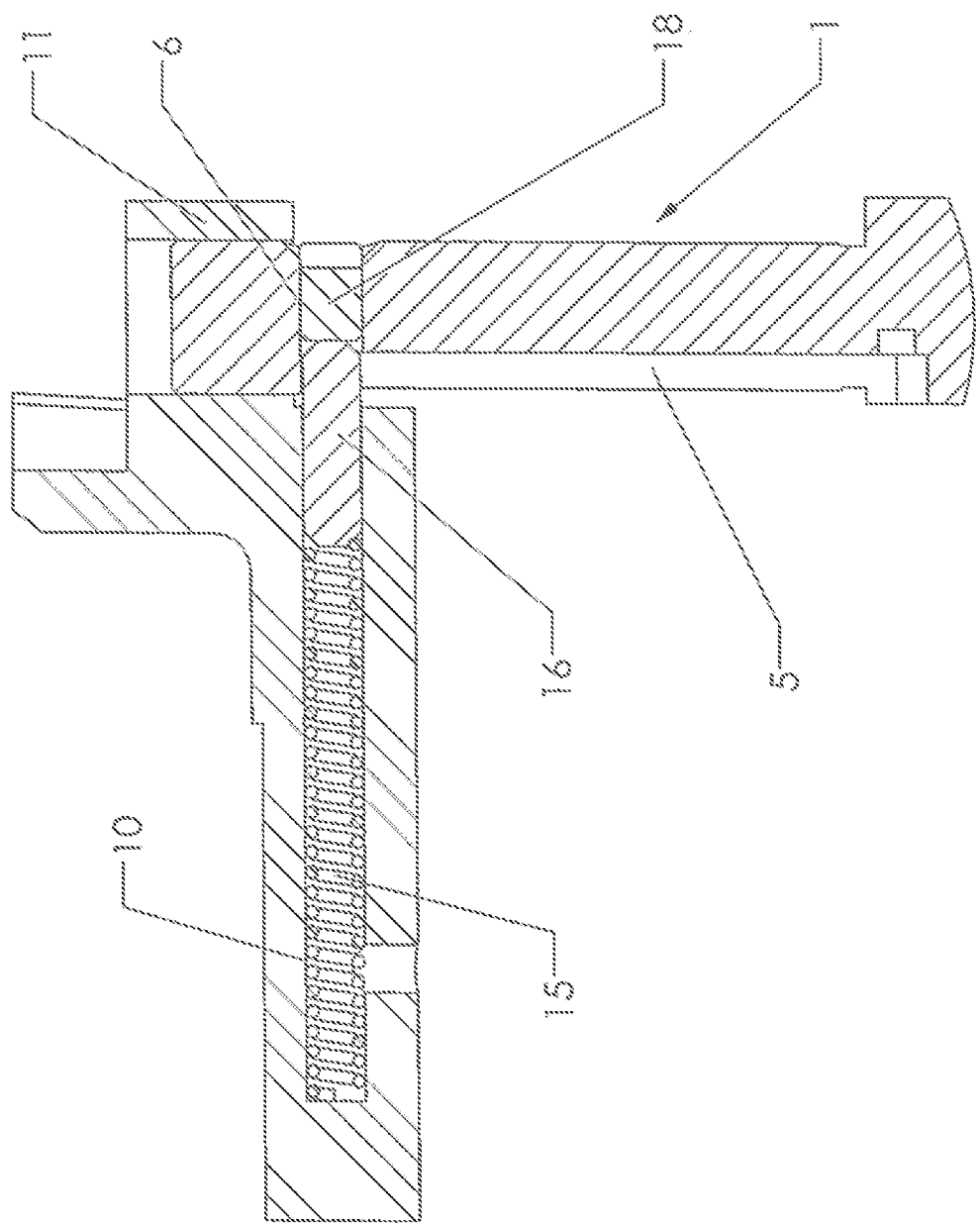
FIG. 9 is a cross-sectional top view illustrating the position, of the pivot pin, the alternative capping device of FIG. 8, and exemplary detent spring, detent pin, and lower receiver, resulting from the early assembly steps illustrated in FIG. 8.

FIGS. 8 and 9 have also been provided to depict pivot pin 1 in combination with plug 18 as an alternative capping device. FIGS. 8 and 9 are the same as FIGS. 5 and 6 except for the alternative capping device. Yet other capping devices may be used, for example, could be any novel design or conventional cap, plug, blockage, or other insert to block or partially block the aperture 6 to an extent that the detent pin cannot slide axially through the aperture past the capping device to exit the pivot pin 1 through the front side opening of the aperture.

To further illustrate the potential advantage and potential adoption of a capping device on any conventional and/or existing pivot pin, FIGS. 10 and 11 depict the use of a plug 118 as a capping device being installed in the apertures/bores 140, 141 of alternative pivot pins 100, 101. The alternative pivot pins 100, 101 are examples of pivot pins having aperture/bores 140, 141 that extend through the pivot pin outside of, not in cooperation with, and not forming or connecting with, either a track 105 or a dimple 106. These pivot pins 100, 101 are also examples of pivots pins that require rotation of the pivot pin on its longitudinal axis, after installation of the detent spring and detent pin through an aperture/bore, to move the track to the detent pin so that the detent pin can move into the track and subsequently ride along the track. See Lanning Research LLC. U.S. Pat. No. 9,243,857, issued Jan. 26, 2016.

The use of a capping device in relationship to any pivot pin aperture may have numerous advantages. For example, the use of a capping device in pivot pins 100, 101 may make assembly easier due to the capping device setting/limiting the position of the detent pin relative to the pivot pin 100, 101. This way, in a pin such as those shown in FIGS. 10 and 11, the user does not need to use a tool poked into the bore 140, 141 to hold the detent pin in a proper position at the outer surface of the main body of the pivot pin, in order so that the user can rotate the pivot pin to match-up/mate the track 105 and the detent pin. Another purpose for a capping device in alternative pivot pins may be to help reduce the migration of moisture and or debris into the pin's track and/or the firearm, which could have negative effects on the firearm's overall operation and safety. Therefore it is to be understood a capping device could be any cap, plug, block, insert, or other stop apparatus used on any pivot pin with an aperture wherein the basic principles of design and operation disclosed herein are the same or similar. The capping device may be configured/adapted to be temporarily retained in/over the aperture, for example, by threading, friction fit, interference fit, or other fastening or gripping.

In conclusion, certain embodiments of the invention comprise: 1) a pivot pin configured to have an aperture that is bored or otherwise placed through the pivot pin to intersect the detent track, for example, for installation and/or removal of a detent pin and/or spring; 2) a pivot pin configured to have an aperture that is bored or otherwise placed through the pivot pin to intersect the detent track, for example, for installation and/or removal of a detent pin and/or spring and the aperture also configured and/or capped to serve as a dimple recess for temporarily controlling position of the detent pin in said dimple recess; 3) a capping device for use in combination with the pivot pin of item 1 or 2; and/or 4) a capping device used for closing/blocking an aperture bored or otherwise placed through any conventional or existing pin.

The preferred pivot pin is made of one or more metals, but may be made of any material suitable for durable and strong use in a firearm, for example. The capping device may be made of one or more metals, but may be made of any material suitable for durable and strong use in a firearm, for example. Even a compressible and/or resilient capping device may be used in certain embodiments.

Although this disclosed technology has been described above with reference to particular means, materials, and embodiments, it is to be understood that the disclosed technology is not limited to these disclosed particulars, but extends instead to all equivalents within the scope of this disclosure and/or following claims. It is understood that further modifications and alternative embodiments of various aspects of the invention may be apparent to those skilled in the field. Thus, it is also understood that certain embodiments of the pivot pin and/or capping device could be materialized from a variety of elements, and certain embodiments may have alternative shapes and dimensions to those portrayed. Further, in certain embodiments, the features of the pivot pin and/or capping device, and the methods of using them, may be utilized and configured independently outside of the realm, and outside of the firearm components, illustrated and described herein.

The invention claimed is:

1. A pivot pin system for use in a firearm, comprising:
a lower receiver comprising a detent chamber receiving a detent spring and a detent pin, an upper receiver pivotally connected to the lower receiver via a pivot pin, the pivot pin comprising:
a main body having a distal end and a proximal end, a generally cylindrical outer surface, and a longitudinal axis between said distal and proximal ends;
a longitudinal track recessed into the main body and having a bottom wall;
an aperture extending entirely through the main body and intersecting said track, the aperture having a first opening at the bottom wall of the track and a second opening at said outer surface diametrically opposed to said first opening, so that the detent spring and detent pin slide in a first direction in the aperture into the detent chamber during installation of the pivot pin in the firearm.

2. The pivot pin system as in claim 1, wherein the aperture is straight and is transverse to the longitudinal track.

3. The pivot pin system as in claim 1, wherein the aperture is nearer the distal end of the main body than the proximal end.

4. The pivot pin system as in claim 1, wherein the pivot pin comprises a single dimple in the track that is recessed relative to the bottom wall and does not pass entirely through the main body.

5. The pivot pin system as in claim 4, wherein said single dimple is nearer the proximal end than the distal end of the main body.

6. The pivot pin system as in claim 1, further comprising a capping device received and temporarily retained in the aperture after the detent spring and detent pin slide in said first direction, the capping device being configured to block at least a portion of the aperture to prevent said detent pin and detent spring from exiting the pivot pin through the aperture in a second direction opposite said first direction.

7. The pivot pin system as in claim 6, wherein the aperture comprises threading and the capping device threadably cooperates with said threading of the aperture.

8. The pivot pin system as in claim 6, wherein the capping device is selected from a group consisting of a cap, set screw, plug, closure, insert, block, insert, stop apparatus, and threaded stop apparatus.

9. The pivot pin system as in claim 6, wherein the capping device is removable from the aperture for allowing the detent pin and detent spring to exit the pivot pin through the aperture in the second direction.

\* \* \* \* \*